United States Patent
Schmidt

(10) Patent No.: US 7,492,700 B2
(45) Date of Patent: Feb. 17, 2009

(54) METHOD AND ANALYZING DEVICE FOR ANALYZING AN OFDM SIGNAL

(75) Inventor: Kurt Schmidt, Grafing (DE)

(73) Assignee: Rohde & Schwarz GmbH & Co., KG, Munich (DE)

( * ) Notice: Subject to any disclaimer, the term of this patent is extended or adjusted under 35 U.S.C. 154(b) by 1149 days.

(21) Appl. No.: 10/712,766

(22) Filed: Nov. 12, 2003

(65) Prior Publication Data

US 2004/0125742 A1    Jul. 1, 2004

(30) Foreign Application Priority Data

Dec. 9, 2002  (EP) ................... 02027409
Mar. 3, 2003  (EP) ................... 03004669

(51) Int. Cl.
*H04J 11/00* (2006.01)

(52) U.S. Cl. ....................... 370/208; 370/430

(58) Field of Classification Search ........... None
See application file for complete search history.

(56) References Cited

U.S. PATENT DOCUMENTS

| | | | |
|---|---|---|---|
| 6,359,938 B1 * | 3/2002 | Keevill et al. ............... | 375/316 |
| 6,510,133 B1 * | 1/2003 | Uesugi ....................... | 370/208 |
| 6,747,946 B1 * | 6/2004 | Kaneko et al. .............. | 370/206 |
| 6,772,181 B1 * | 8/2004 | Fu et al. ..................... | 708/313 |
| 7,206,350 B2 * | 4/2007 | Korobkov et al. ........... | 375/260 |

* cited by examiner

*Primary Examiner*—Firmin Backer
*Assistant Examiner*—Roberta A Shand
(74) *Attorney, Agent, or Firm*—Christensen O'Connor Johnson Kindness PLLC

(57) ABSTRACT

The invention concerns a method for analysing an OFDM signal ($r_{IF}(t)$) transporting a series of data symbols on several orthogonal carrier frequencies, each data symbol having a useful part separated by a guard period from neighboring data symbols, with an analysing device (40) having a signal section (20) with a bandwidth ($BW_A$) smaller than the bandwidth ($BW_{OFDM}$) of the OFDM signal. The method comprises the steps of low pass filtering of the OFDM signal with a low pass filter (24) and shifting (26) the spectrum of the OFDM signal in order to obtain a frequency shifted filtered OFDM signal ($r(i)$), whereby the length of the impulse response of the low pass filter (24) is shorter than the length of the guard periods of the data symbols.

11 Claims, 3 Drawing Sheets

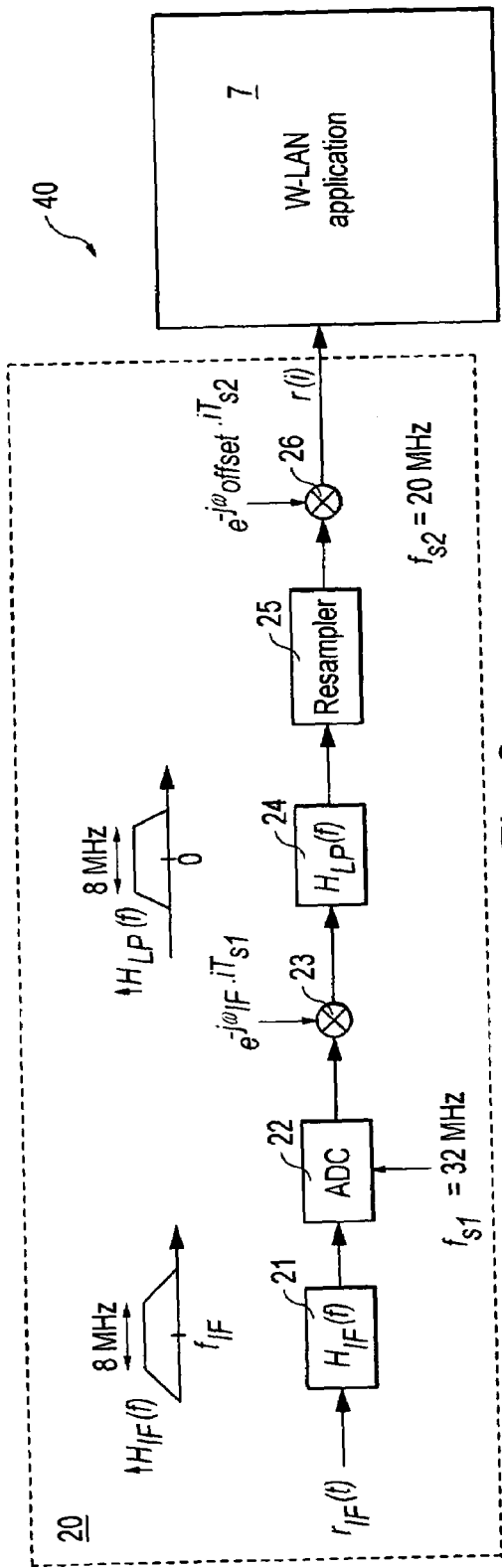
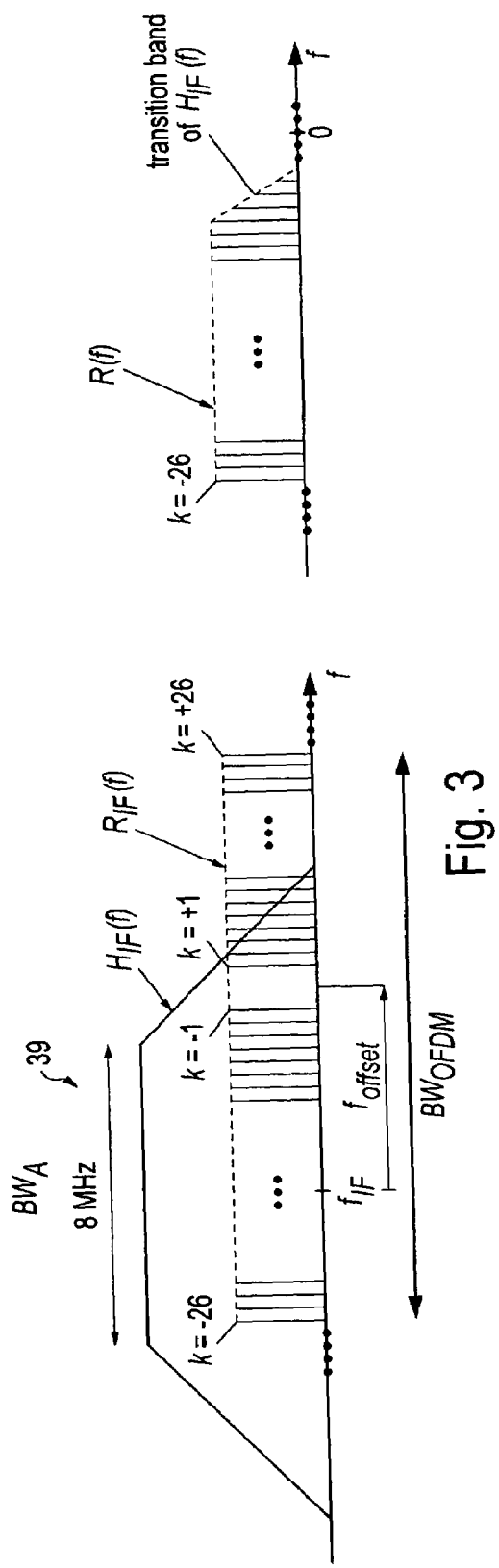

METHOD AND ANALYZING DEVICE FOR ANALYZING AN OFDM SIGNAL

CROSS-REFERENCE TO RELATED APPLICATIONS

This application claims priority benefit under 35 U.S.C. § 119 to European patent application No. 02 027 409.8, filed Dec. 9, 2002, and No. 03 004 669.2, filed Mar. 3, 2003, which are incorporated herein by reference.

This application concerns a simplified analysis of an OFDM (Orthogonal Frequency Division Multiplex)-signal, especially an OFDM signal for Wireless LAN as defined in IEEE802.11a, Part 11: "Wireless LAN Medium Access Control (MAC) and Physical Layer (PHY) specifications" referred herein as IEEE W-LAN Standard.

It is the principle of an OFDM system to transmit the signal via several orthogonal sub-carriers. The principle of OFDM is explained e.g. in Hermann Rohling, Thomas May, Karsten Brüninghaus und Rainer Grünheid, "Broad-Band OFDM Radio Transmission for Multimedia Applications", Proceedings of the IEEE, Vol. 87, No. 10, October 1999, pages 1778 ff.

A receiver design for wireless broad-band systems is known from Speth, Fechtel, Fock, Meyr: "Optimum Receiver Design for Wireless Broad-Band Systems Using OFDM—Part I", IEEE Trans. On Comm. Vol. 47, No. 11, November 1999, pages 1668-1677 and Speth, Fechtel, Fock, Meyr: "Optimum Receiver Design for Wireless Broad-Band Systems Using OFDM—Part II", IEEE Trans. On Comm. Vol. 49, No. 4, April 2001, pages 571-578.

The signal of wireless LAN systems is analysed in order to monitor the signal quality. For example the error vector magnitude EVM of the whole signal or of specific sub-carriers is a typical parameter to describe the signal quality.

In the past only analysing devices with wideband signal processing, especially with a wideband intermediate frequency IF section, have been used. Such analysing devices with wideband signal processing are, however, rather expensive.

Thus, it is the object of the present invention to provide a method and an analysing device being able to analyse wideband OFDM signals, especially wireless LAN signals, in spite of their reduced bandwidth.

The object is solved by the features of the method, by the features of the analyzing device, and by a storage medium storing a respective computer program.

According to the invention the spectrum of the OFDM signal can be shifted so that different parts of the OFDM spectrum can lie within the reduced bandwidth of the analysing device. Low pass filtering is necessary to suppress the mirror frequency and to limit the input bandwidth for a resampler following in the signal path.

According to one aspect of the invention the length of the impulse response of the low pass filter is shorter than the length of the guard periods of the data symbols.

The OFDM signal, especially the OFDM signal for wireless LAN application, generally has several pilot channels at specific carrier frequencies. According to IEEE W-LAN standard there are four carrier frequencies transporting a pilot signal. As the analysing device has a reduced bandwidth, not all pilot channels lie within the reduced bandwidth of the analysing device. For example, the number of useable pilot channels can be reduced from four to two. The analysing device has to estimate several synchronisation parameters of the OFDM signal, e.g. frequency offset, time or clock offset, phase offset resulting from the frequency offset and the clock offset and the gain. The accuracy of the estimation of these parameters is reduced due to the fact that only a reduced number of pilot channels can be used for the estimation.

According to another aspect of the present invention this is compensated by averaging the estimated synchronisation parameters in OFDM-symbol direction in order to achieve the same accuracy which would apply to the use of the original number of pilot channels.

The dependent claims concern further developments of the invention.

An embodiment of the present invention is described in the following with reference to the drawings. In the drawings FIG. 1 shows the block diagram of a conventional analysing device;

FIG. 2 shows the block diagram of an inventive analysing device;

FIG. 3 shows the spectrum of the OFDM signal and the reduced bandwidth of signal section 20 of the inventive analysing device;

Figure 1:
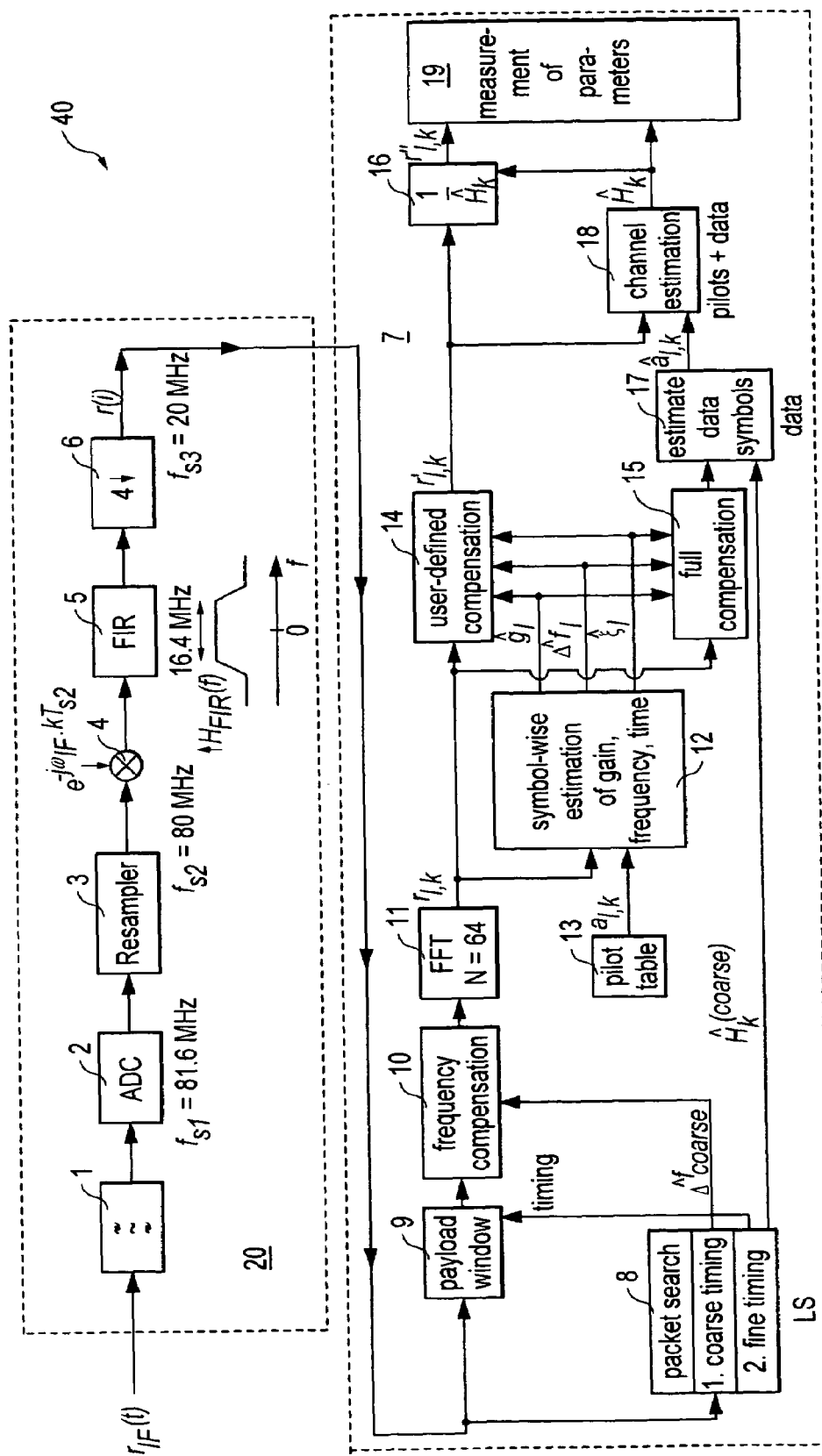

This following description with reference to FIG. 1 gives a rough view over the signal processing of the IEEE802.11a application. Details are disregarded in order to get a concept overview.

In the following text the abbreviations

| | |
|---|---|
| $a_{l,k}$ | symbol l of sub-carrier k |
| $EVM_k$ | error vector magnitude of sub-carrier k |
| EVM | error vector magnitude of current packet |
| $\Delta f$ | frequency deviation between transmitter Tx and receiver Rx |
| l | symbol index l = [1, nof_Symbols] |
| nof_symbols | number of symbols of payload |
| $H_k$ | channel transfer function of sub-carrier k |
| k | channel index k = [−31,32] |
| $K_{mod}$ | modulation dependant normalisation factor |
| $\xi$ | relative clock error of reference oscillator |
| $r_{l,k}$ | sub-carrier k of symbol l | are used. In this application the hat ^ generally describes an estimate. Example: $\hat{x}$ is the estimate of x. In this application the tilde generally describes a trial parameter. Example: $\tilde{x}$ is the trial parameter of x.

The diagram of the interesting blocks of analysing device 40 is shown in FIG. 1. First the RF signal is downconverted to the intermediate IF frequency, e.g. $f_{IF}=20.4$ MHz. The resulting IF signal $r_{IF}(t)$ is shown on the left-hand side of FIG. 1. After band pass filtering in block 1 of IF signal section 20, the signal is sampled by an analog to digital converter (ADC) 2 at a sampling rate of e.g. $f_{s1}=81.6$ MHz. This digital sequence is resampled in resampler 3 to the new sampling frequency of e.g. $f_{s2}=80$ MHz which is a multiple of the Nyquist rate (20 MHz) The subsequent digital down converter 4 shifts the IF signal to the complex base band. In the next step the base band signal is filtered by a FIR filter 5. To get an idea, the rough transfer function is plotted in FIG. 1. This FIR filter 5 fulfils two tasks: first it suppresses the IF image frequency, secondly it attenuates the aliasing frequency bands caused by the subsequent down sampling in down sampler 6. After filtering, the sequence is sampled down by the factor of 4. Thus, the sampling rate of the down sampled sequence r(i) is the Nyquist rate of $f_{s3}=20$ MHz. Up to this point the digital part of IF signal section 20 can be implemented in an ASIC.

In the lower part of FIG. 1 the subsequent digital signal processing is shown and designated as W-LAN application block 7. In the first block 8 the packet search is performed. This block 8 detects the long symbol LS and recovers the timing. The coarse timing is detected first. This search is preferably implemented in the time domain. The algorithm is based on the cyclic repetition within the LS after N=64 samples. Furthermore, a coarse estimate $\Delta \hat{f}_{coarse}$ of the receiver-transmitter Rx-Tx frequency offset $\Delta f$ is derived from the metric. This can easily be understood because the phase of r(i)·r*(i+N) is determined by the frequency offset. As the frequency deviation $\Delta f$ can exceed half a bin (distance between neighbour sub-carriers) the preceding short symbol SS is also analysed in order to detect the ambiguity.

After the coarse timing calculation the time estimate is improved by the fine timing calculation. This is achieved by first estimating the coarse frequency response $\hat{H}_k^{(coarse)}$, with k=[−26,26] denoting the channel index of the occupied sub-carriers. First, the fast fourier transform FFT of the long symbol LS is calculated. After the FFT calculation the known symbol information of the LS sub-carriers is removed dividing by the symbols. The result is a coarse estimate $\hat{H}_k^{(coarse)}$ of the channel transfer function. In the next step the complex channel impulse response is computed by an IFFT. Next, the energy of the windowed impulse response (the window size is equal to the guard period) is calculated for every trial time. Afterwards, the trial time of the maximum energy is detected. The trial time is used to adjust the timing.

Now the position of the long symbol LS is known and the starting point of the useful part of the first payload symbol can be derived. In the next block 9 this calculated time instant is used to position the payload window. Only the payload part is windowed. This is sufficient because the payload is the only subject of the subsequent measurements.

In the next block 10 the windowed sequence is compensated by the coarse frequency estimate $\Delta \hat{f}_{coarse}$. This is necessary because otherwise inter channel interference (ICI) would occur in the frequency domain.

The transition to the frequency domain is achieved by an fast fourier transform FFT of e.g. length 64 in block 11. The FFT is performed symbolwise for everyone of the nof_symbols symbols of the payload. The calculated FFTs are described by $r_{l,k}$ with the symbol index l=[1,nof_symbols] and the channel index k=[−31,32] for example.

In case of an additive white Gaussian noise (AWGN) channel the FFT can be described by $$r_{l,k}=K_{mod} \cdot a_{l,k} \cdot H_k \cdot e^{j2\pi \cdot N_s/N \cdot \phi_k \cdot l}+n_{l,k} \qquad (1)$$

with
- the modulation-dependant normalisation factor $K_{mod}$,
- the symbol $a_{l,k}$ of sub-carrier k at symbol l,
- the channel frequency response $H_k$,
- the phase drift $\phi_k$ of sub-carrier k within one useful part of the symbol T (see below),
- the number of Nyquist samples, e.g. $N_s=80$ of the symbol period,
- the number of Nyquist samples, e.g. N=64 of the useful part of the symbol and
- the independent Gaussian distributed noise samples $n_{l,k}$.

Furthermore, the channel dependant phase drift $\phi_k$ (phase drift within one useful part of the symbol) is given by $$\phi_k=\xi \cdot k+\Delta f T \qquad (2)$$

whereas
- $\xi$=the relative clock deviation of the reference oscillator and
- $\Delta f$=the (not yet compensated) frequency deviation.

In eq. (1) both the phase drift $\phi_k$ caused by the not yet compensated frequency deviation $\Delta f$ and the clock deviation $\xi$ may not be neglected. This is illustrated by an example: In accordance with the IEEE W-LAN Standard the allowed clock deviation of the device under test (DUT) is up to $\xi_{max}=20$ ppm. Furthermore, a long packet with nof_symbols=400 symbols is assumed. From eq. (1), (2) it results that the phase drift of the highest sub-carrier k=26 in the last symbol l=nof_symbols is 93 degrees. Even in the noise free case this would lead to symbol errors. The example shows that it is also necessary to estimate and compensate the clock deviation, which is accomplished in the estimation block 12 using pilot table 13 and in the compensation blocks 14 and 15.

As discussed above, the FFT must be followed by the joint estimation of the gain g, the fine frequency deviation $\Delta f$ and the clock deviation $\xi$. Concerning to IEEE W-LAN Standard, Chapter 17.3.9.7, "Transmit modulation accuracy test", the phase drift must be estimated from the pilot sub-carriers. Hence the estimation is performed independently for every symbol, the symbol index l is appended to the estimation parameters in the subsequent formulas.

In addition the tracking of the gain g is supported symbol for symbol. The reason is that the reference gain g=1 occurs at the time instant of the long symbol. At this time the coarse channel transfer function $\hat{H}_k^{(coarse)}$ is calculated. This is useful because before symbol estimation the sequence $r'_{l,k}$ is compensated by the coarse channel transfer function $\hat{H}_k^{(coarse)}$. Consequently a potential change of the gain at the symbol l (caused, for example, by the increase of DUT amplifier temperature) would increase the symbol error rate especially at large symbol alphabet M of the MQAM transmission. In this case the estimation and the subsequent compensation of the gain is useful. In the subsequent formulas the gain at the symbol l will be described by the parameter $g_l$.

In this application the optimum maximum likelihood algorithm is used. Consequently, the log likelihood function $$L(\tilde{g}_l, \Delta \tilde{f}_l, \tilde{\xi}_l) \stackrel{eq.\_(1)}{=} \sum_{k=-21,-7,7,21} \sum_{l=1}^{nof\_symbols} \left| r_{l,k} - a_{l,k} \cdot \tilde{g}_l \cdot \hat{H}_k^{(coarse)} \cdot e^{j2\pi \cdot N_s/N \cdot \tilde{\phi}_k \cdot l} \right|^2 \qquad (3)$$

$$\text{with } \tilde{\phi}_k \stackrel{eq.\_(2)}{=} \tilde{\xi}_l \cdot k + \Delta \tilde{f}_l T$$

is calculated as a function of the trial parameters $\tilde{g}_l$, $\Delta \tilde{f}_l$ and $\tilde{\xi}_l$. Finally, the trial parameters leading to the minimum of the log likelihood function are used as estimates $\hat{g}_l$, $\Delta \hat{f}_l$ and $\hat{\xi}_l$. In eq. (3) the known pilot symbols $a_{l,k}$ are read from table 13. It can be shown that the search procedure is independent of the frequency response $H_k$ (see eq. (3)). Therefore, only the current $r_{l,k}$ and $a_{l,k}$ are required. This robust algorithm even works well at low signal to noise ratios of about 5 dB with the Cramer Rao Bound being reached.

After estimation the three parameters, the sequence $r_{l,k}$ is compensated in the compensation blocks 14 and 15. In the upper analysing branch the compensation is user-defined i.e. the user determines which of the three parameters are compensated in compensation block 14. This is useful in order to extract the influence of these parameters. The resulting output sequence is described by $r'_{l,k}$. In the lower compensation branch the full compensation is always performed in compensation block 15. This separate compensation is necessary in order to avoid symbol errors. After the full compensation the secure estimation of the data symbols $\hat{a}_{l,k}$ is performed. From equation (1) it is clear that first the channel transfer function $H_k$ must be removed. This is achieved by dividing the known coarse channel estimate $\hat{H}_k^{(coarse)}$ calculated from the LS. Usually an error free estimation of the data symbols can be assumed.

Concerning IEEE W-LAN Standard, Chapter 17.3.9.7, "Transmit modulation accuracy test", a better channel estimate $\hat{H}_k$ of the data and pilot sub-carriers must be calculated by using the whole nof_symbols symbols of the payload. This can be accomplished in block 18 at this point because the phase is compensated and the data symbols are known.

In the following block 16 $r'_{l,k}$ is divided by the improved estimates $\hat{H}_k$. The resulting channel compensated sequence is described by $r''_{l,k}$.

In the last block 19 the measurement variables are calculated. The most important variable is the error vector magnitude $$EVM_k = \sqrt{\frac{1}{\text{nof\_Symbols}} \cdot \sum_{l=1}^{\text{nof\_Symbols}} |r'_{l,k} - K_{mod} \cdot a_{l,k}|^2} \quad (4)$$

of the sub-carrier k of the current packet. Furthermore, the packet error vector magnitude $$EVM = \sqrt{\frac{1}{52} \cdot \sum_{\substack{k=-26 \\ (k \neq 0)}}^{26} EVM_k^2} \quad (5)$$

is derived by averaging the squared $EVM_k$ versus k. Finally, the average error vector magnitude $$\overline{EVM} = \sqrt{\frac{1}{\text{nof\_packets}} \sum_{counter=1}^{\text{nof\_packets}} EVM^2(\text{counter})} \quad (6)$$

is calculated by averaging the packet EVM of all nof_packets detected packets. This parameter is equivalent to the so-called "RMS average of all errors $\text{Error}_{RMS}$" of the IEEE802.11a measurement commandment, see IEEE W-LAN Standard, Chapter 17.3.9.7.

In the following text the abbreviations

| | |
|---|---|
| $f_{IF}$ | IF frequency |
| $f_{bin}$ | frequency distance between neighbour sub-carriers |
| $H\_(f)$ | filter transfer function |
| i | time index of the sampled sequence |
| k | channel index of occupied sub-carriers k = [−26,26] |
| $T_s = 1/f_s$ | sample period and frequency respectively | are used.

FIG. 1 describes the W-LAN signal processing using a wide-band signal section 20, such as Rohde & Schwarz device FSQ. The available bandwidth of the FSQ is 27 MHz and therefore sufficient to measure the IEEE802.11a signal with a bandwidth of 16.4 MHz.

In the following the. W-LAN application is discussed using an signal section 20 of the analysing device 40 with narrower bandwidth, such as Rohde & Schwarz device FSP. The problem is the smaller FSP analyser bandwidth of 8 MHz which only covers half of the OFDM signal bandwidth. The main idea of the present invention is to analyse the spectrally cut measurement signal with carefully designed filters. Simulations have shown that following properties can be expected:

- About 20 of the 52 sub-carriers can be analysed within a measurement.
- The position of the analysing window can be selected by the operator, e.g. to analyse the left, the middle or the right sub-carriers.
- Also symbolwise tracking of timing, phase and gain is supported.

In FIG. 2 the diagram of the interesting blocks of signal section 20 is shown. The description starts with the IF signal $r_{IF}(t)$ at the IF frequency, e.g. $f_{IF}$=21.4 MHz. For simplification the IF signal is not yet bandlimited. The bandwidth 8 $W_A$ of signal section 20 of 8 MHz is modelled by the subsequent IF filter 21 with the frequency transfer function $H_{IF}(f)$. The schematic spectrum $R_{IF}(f)$ of the input signal is shown in FIG. 3. The bandwidth $BW_{OFDM}$ of the spectrum of the OFDM signal and the reduced bandwidth $BW_A$ of the analysing device 40 are indicated in FIG. 3. It can be seen that the middle of the OFDM spectrum (at sub-carrier k=0) is shifted from the IF frequency $f_{IF}$ by the user definable frequency offset $f_{offset}$. By varying $f_{offset}$ the position of the analysing window 39 can be changed. If for example the frequency offset is set to $f_{offset}$=0 the analysing window 39 is set in the middle of the OFDM spectrum. Furthermore, the schematic transfer function $H_{IF}(f)$ is shown in FIG. 3. The passband bandwidth $BW_A$ of the example is 8 MHz and symmetric to the IF frequency. The sub-carriers in the undistorted passband will be analysed.

The main task of the IF filter 21 is to avoid aliasing effects in the 8 MHz analysing window by the subsequent sampling process of the Analog to Digital Converter (ADC) 22. The sampling rate of the ADC is e.g. $f_{s1}$=32 MHz.

Next, the sampled IF sequence is multiplied with the sequence $e^{-j\omega_{IF} i T_{s1}}$ in multiplier 23, whereby the sampling period is defined by $T_{s1}=1/f_{s1}$. This complex multiplication effects a spectral shift from the IF frequency $f_{IF}$ to base band.

The following low pass filter 24 with the transfer function $H_{LP}(f)$ also possesses the passband bandwidth of 8 MHz, see schematic plot in FIG. 3, and fulfils two tasks:

- Suppression of the mirror at $f=-2f_{IF}$ caused by the spectral shift.
- The low pass filter 24 must avoid aliasing effects in the e.g. 8 MHz analysing window 39 caused by the subsequent resampling process. As the resampling process reduces the sample rate, the transition band at low pass filter 24 must be steeper compared to the IF filter 21.

Next the sampling must be changed to the Nyquist rate. This is performed by a digital resampler 25. The output sequence is generated at the desired Nyquist rate of e.g. $f_{s2}=20$ MHz.

Afterwards the resampled sequence is multiplied with the sequence $e^{-j\omega_{offset} \cdot iT_{s2}}$ in multiplier 26. This operation generates a further spectral shift by the frequency $f_{offset}$. This spectral shift can be integrated in the first down conversion, if the resampling process does not require a low pass input sequence. The resulting output sequence is r(i).

The schematic spectrum R(f) again is shown in FIG. 3. It is transparent that r(i) is the OFDM signal in baseband position, i.e. the channel k=0 is located at the frequency f=0. Furthermore, the sub-carriers within the analysing window 39 of 8 MHz are not distorted. The position of the analysing window can be chosen by the correspondent frequency offset $f_{offset}$.

Afterwards, the sequence r(i) enters into the W-LAN application 7 which is identical to the wideband FSQ implementation shown in FIG. 1. Thus reference is made to the lower part of FIG. 1.

Figure 4:
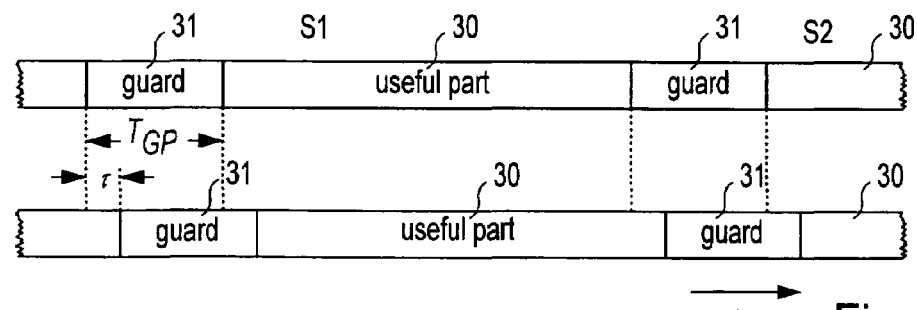
FIG. 4 shows a symbol sequence of one channel of the OFDM signal with the useful part and the guard period.

According to one aspect of the present invention it is important that the length τ of the impulse response h(t) the low pass filter 24 is shorter than the length $T_{GA}$ of the guard periods of the data symbols. To illustrate this, two data symbols S1 and S2 of the data sequence of one of the pilot carriers is shown in FIG. 4. It can be seen that the useful part 30 of each data symbol is separated from a neighbouring data symbol by a guard period 31, which has the time length $T_{GP}$. The lower part of FIG. 4 illustrates the time shift resulting from the low pass filter 24.

Figure 5:
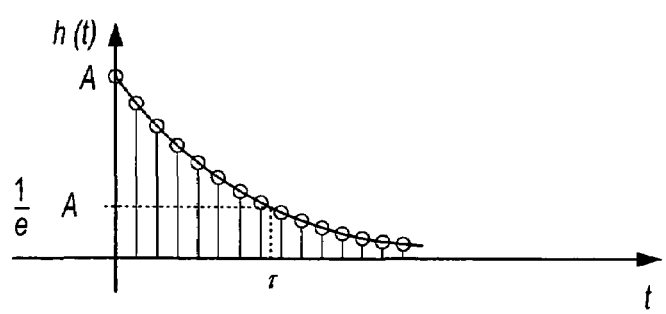
FIG. 5 shows a schematic diagram of impulse response of low pass filter 24.

The impulse response h(t) of low pass filter 24 has a specific length τ. There are several possibilities to define the length τ of the impulse response h(t). One possibility is illustrated in FIG. 5. FIG. 5 shows a typical impulse response h(t) of a low pass filter. The filter is treated with a dirac impulse at time t=0. The impulse response h(t) decreases from starting value A to value 1/e·A within the time period τ which can be used as a definition of the length τ of the impulse response h(t).

This length τ can also be defined from the bandwidth $BW_A$ of the filter. If low pass filter 24 has a bandwidth $BW_A$ of 8 MHz the length τ of the impulse response of the filter 24 can be defined as $$\tau=1/BW_A.$$

In the embodiment discussed above it is $$\tau=\frac{1}{8} \text{ MHz}=125 \text{ ns}$$

This definition is used within this application, i.e. the length τ of the impulse response of low pass filter 24 is defined as the inverse $1/BW_A$ of the bandwidth $BW_A$ of the low pass filter 24.

The length τ of the impulse response h(t) is preferably shorter than ¼ of the length $T_{GP}$ of guard periods 31 and most preferably about 2.5/16 of the length $T_{GP}$ of the guard periods 31, as in the example of IEEE W-LAN standard the length $T_{GP}$ of the guard periods 31 has the length of 16 symbols, which is 16·50 ns=800 ns, and 125 ns length of impulse response is equivalent to the length of 2.5 symbols, thus $\tau/T_{GP}=2.5/16$.

Thus, only small inter symbol interference (ISI) have to be expected. Simulations have confirmed this statement.

Further it is important to note, how many sub-carriers can be analysed in a measurement. The maximum number of sub-carriers within the transmission band of 8 MHz is $$nof_{Subcarrier} = \frac{f_{pass}}{f_{bin}} = \frac{8 \text{ MHz}}{312.5 \text{ kHz}} \approx 25.$$

From a more conservative view about 20 sub-carriers can be used for the measurement.

It should be noticed that even this bandlimited measurement supports symbolwise tracking. This is possible because there are according to the invention always 2 pilot sub-carriers of the total 4 pilot sub-cariers within the 8 MHz analysing window. The pilots are used for symbolwise tracking, i.e. optional phase and/or timing and/or gain. The smaller number of used pilot carriers (2 instead of usually 4) leads to a higher estimation error of the synchronisation parameters $\Delta \hat{f}_l, \hat{\xi}_l$ and consequently to an increase of the EVM compared to a measurement with no limitation of the bandwidth. The statistical increase can be calculated however and can be compensated by averaging the synchronisation parameters $\Delta \hat{f}_l, \hat{\xi}_l$ over several data symbols.

Furthermore, simulations have shown that the preamble synchronisation also works well in the case of the bandlimited OFDM signal and is robust for low signal to noise ratios.

Figure 6:
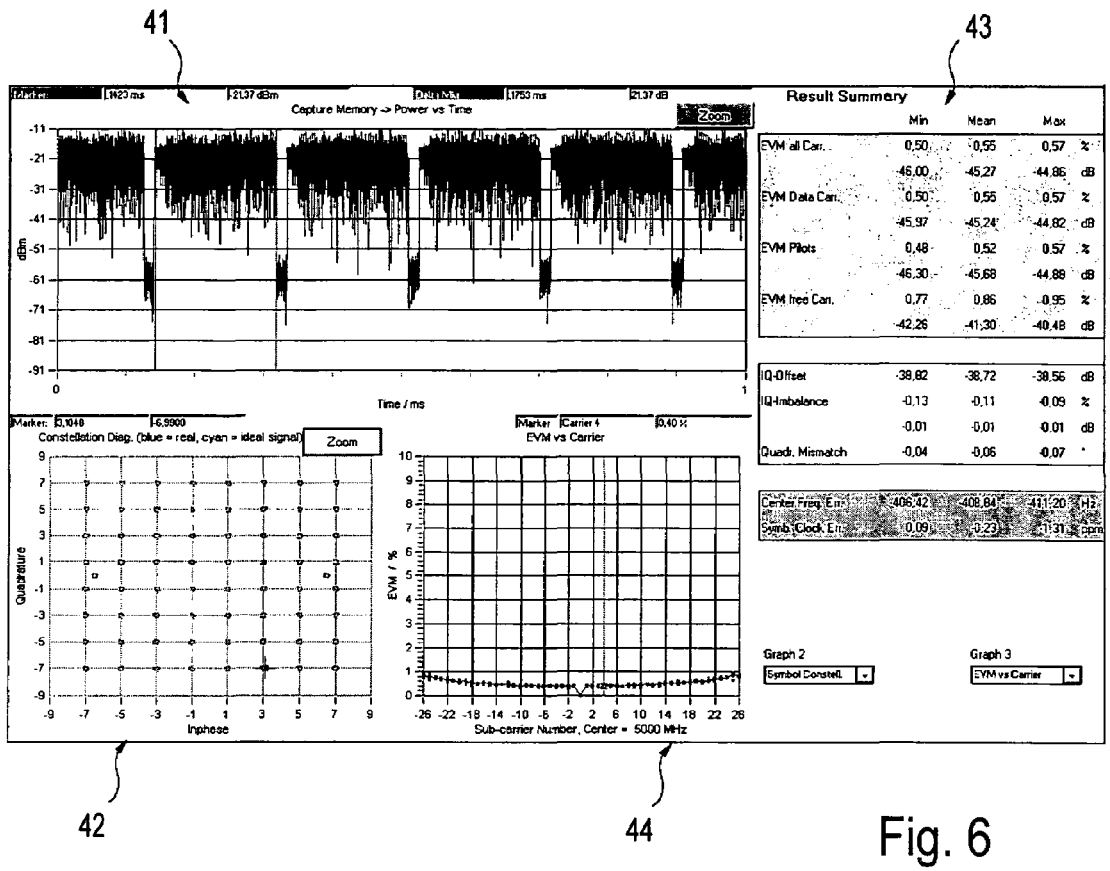
FIG. 6 shows an example of the screen of the analysing device with specific diagrams.

FIG. 6 shows a typical screen plot of an analysing device 40. Section 41 shows the bursts of a specific sub-carrier of the OFDM signal. Section 42 shows the constellation diagram on a specific sub-carrier. Section 43 indicates EVM of all carriers, of the data carriers, the pilot carriers and the free carriers. Further, the IQ-Offset, IQ-Imbalance and quadrature mismatch are shown. Section 44 shows a diagram with EVM as a function of the sub-carrier number.

The invention claimed is:

1. Method for analysing an OFDM signal ($r_{IF}(t)$) with an analysing device (40) having a signal section (20) with a bandwidth ($BW_A$) smaller than the bandwidth ($BW_{OFDM}$) of the OFDM signal, the OFDM signal ($r_{IF}(t)$) transporting a series of data symbols (S1, S2, . . . ) on several orthogonal carrier frequencies, each data symbol (S1) having a useful part (30) separated by a guard period (31) from neighbouring data symbols (S2), comprising the steps of low pass filtering of the OFDM signal with a low pass filter (24) and shifting (26) the spectrum of the OFDM signal in order to obtain a frequency shifted filtered OFDM signal (r(i)), whereby the length (τ) of the impulse response (h(t)) of the low pass filter (24) is shorter than ¼ of the length ($T_{GP}$) of the guard periods (31) of the data symbols (S1, S2, . . . ).

2. Method according to claim 1, characterised in that the length (τ) of the impulse response (h(t)) of the low pass filter (24) is about 2.5/16 of the length ($T_{GP}$) of guard periods (31) of the data symbols (S1, S2, . . . ).

3. Method for analysing an QFDM signal ($r_{IF}(t)$) transporting a series of data symbols (S1, S2, . . . ) on several orthogonal carrier frequencies with an analysing device (40) having a signal section (20) with a bandwidth ($BW_A$) smaller than the bandwidth ($BW_{OFDM}$) of the OFDM signal, whereby a first specific number of carrier frequencies transport a pilot signal within the OFDM signal, comprising the steps of low pass filtering of the OFDM signal with a low pass filter (24) and shifting (26) the spectrum of the OFDM signal in order to obtain a frequency shifted filtered OFDM signal (r(i)), and estimating (12) several synchronisation parameters ($\Delta \hat{f}_l, \hat{\xi}_l$) of the OFDM signal by use of the pilot signal, whereby the number of useful carrier frequencies transporting the pilot signal is reduced to a second specific number by the signal section (20) with its bandwidth ($BW_A$) smaller than the bandwidth ($BW_{OFDM}$) of the OFDM signal and averaging (12) the estimated synchronisation parameters ($\Delta \hat{f}_l, \hat{\xi}_l$) of the OFDM signal over several data symbols in order to compensate the reduced number of useful carrier frequencies transporting the pilot signal;

wherein each data symbol (S1) has a useful part (30) separated by a guard period (31) from neighbouring data symbols (S2), whereby the length (τ) of the impulse response (h(t)) of the low pass filter (24) is shorter than ¼ of the length ($T_{GP}$) of the guard periods (31) of the data symbols (S1, S2, . . . ).

4. Method according to claim 3, characterised in that the first specific number is 4 and the second specific number is 2.

5. Method according to claim 3, characterised in that the estimated characteristic values of the OFDM signal are symbolwise frequency offset ($\Delta \hat{f}_l$) and/or clock offset ($\hat{\xi}_l$) and/or phase offset resulting therefrom and/or gain ($\hat{g}_l$).

6. Method according to claim 3, characterised in that the estimation of the synchronisation parameters is done for each symbol of the pilot signal and is averaged over several symbols.

7. Method according to claim 6, characterised in that the length (τ) of the impulse response (h(t)) of the low pass filter (24) is about 2.5/16 of the length of the guard periods (31) of the data symbols (S1, S2, . . . ).

8. Method according to claim 1, characterised in that the OFDM signal is resampled (25) after low pass filtering (24).

9. Analysing device (40) for analysing an OFDM signal ($r_{IF}(t)$) transporting a series of data symbols (S1, S2, . . . ) on several orthogonal carrier frequencies, each data symbol (S1) having a useful part (30) separated by a guard period (31) from neighbouring data symbols (S2), whereby the analysing device (40) has a signal section (20) with a bandwidth ($BW_A$) smaller than the bandwidth ($BW_{OFDM}$) of the OFDM signal, whereby the analysing device (40) has a low pass filter (24) for low pass filtering of the OFDM signal and a frequency shifter (26) for shifting the spectrum of the OFDM signal in order to obtain a frequency shifted filtered OFDM signal (r(i)), and whereby the length (τ) of the impulse response (h(t)) of the low pass filter (24) is shorter than ¼ of the length ($T_{GP}$) of the guard periods (31) of the data symbols (S1, S2, . . . ).

10. Analysing device (40) for analysing an OFDM signal $r_{IF}(t)$) transporting a series of data symbols (S1, S2, . . . ) on several orthogonal carrier frequencies, whereby the analysing device (40) has a signal section (20) with a bandwidth ($BW_A$) smaller than the bandwidth ($BW_{OFDM}$) of the OFDM signal within the OFDM signal, whereby a first specific number of carrier frequencies transport a pilot signal, whereby the analysing device (40) has a low pass filter (24) for low pass filtering of the OFDM signal and a frequency shifter (26) for shifting the spectrum of the OFDM signal in order to obtain a frequency shifted filtered OFDM signal (r(i)), and estimating means (12) for estimating several synchronisation parameters ($\Delta \hat{f}_l, \hat{\xi}_l$) of the OFDM signal by use of the pilot signal, whereby the number of carrier frequencies transporting the pilot signal is reduced to a second specific number by the signal section (20) with its bandwidth ($BW_A$) smaller than the bandwidth ($BW_{OFDM}$) of the OFDM signal and whereby the estimating means (12) averages the estimated synchronisation parameters ($\Delta \hat{f}_l, \hat{\xi}_l$) of the OFDM signal over several data symbols 1 in order to compensate the reduced number of carrier frequencies transporting the pilot signal;

wherein each data symbol (S1) has a useful part (30) separated by a guard period (31) from neighbouring data symbols (S2), whereby the length (τ) of the impulse response (h(t)) of the low pass filter (24) is shorter than ¼ of the length ($T_{GP}$) of the guard periods (31) of the data symbols (S1, S2, . . . ).

11. Digital storage medium with control signals electronically readable from the digital storage medium, which interact with a programmable computer or digital signal processor in a manner that all steps of the method according to claim 1 can be performed.

* * * * *

UNITED STATES PATENT AND TRADEMARK OFFICE
CERTIFICATE OF CORRECTION

PATENT NO.         : 7,492,700 B2                                    Page 1 of 1
APPLICATION NO.    : 10/712766
DATED              : February 17, 2009
INVENTOR(S)        : K. Schmidt It is certified that error appears in the above-identified patent and that said Letters Patent is hereby corrected as shown below:

On the Title Pg

Item (30)    Foreign Appln. Priority Data    "02027409" should read --02027409.8--

Item (30)    Foreign Appln. Priority Data    "03004669" should read --03004669.2--

Signed and Sealed this

Twenty-third Day of June, 2009

JOHN DOLL
*Acting Director of the United States Patent and Trademark Office*